United States Patent
Ward et al.

(10) Patent No.: US 10,885,061 B2
(45) Date of Patent: Jan. 5, 2021

(54) BANDWIDTH MANAGEMENT IN A DATA STORAGE SYSTEM

(71) Applicant: INTERNATIONAL BUSINESS MACHINES CORPORATION, Armonk, NY (US)

(72) Inventors: Matthew J. Ward, Vail, AZ (US); Gregory E. McBride, Tucson, AZ (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 238 days.

(21) Appl. No.: 16/052,340

(22) Filed: Aug. 1, 2018

(65) Prior Publication Data

US 2020/0042631 A1 Feb. 6, 2020

(51) Int. Cl.
*G06F 16/00* (2019.01)
*G06F 16/27* (2019.01)
*G06F 16/23* (2019.01)

(52) U.S. Cl.
CPC .......... *G06F 16/27* (2019.01); *G06F 16/2365* (2019.01)

(58) Field of Classification Search
None
See application file for complete search history.

(56) References Cited

U.S. PATENT DOCUMENTS

| | | | |
|---|---|---|---|
| 7,457,980 B2 | 11/2008 | Yang et al. | |
| 7,552,295 B2 | 6/2009 | Kern et al. | |
| 7,930,499 B2 | 4/2011 | Duchesne | |
| 8,762,642 B2 | 6/2014 | Bates et al. | |
| 9,405,628 B2 | 8/2016 | Blea et al. | |
| 9,619,331 B2 | 4/2017 | Blea et al. | |
| 9,823,973 B1 | 11/2017 | Natanzon | |
| 9,898,469 B1 | 2/2018 | Dorin et al. | |
| 2015/0095585 A1 | 4/2015 | Subrahmanyam et al. | |
| 2015/0205680 A1 | 7/2015 | Kimmel et al. | |
| 2016/0196324 A1 | 7/2016 | Haviv et al. | |
| 2016/0321225 A1* | 11/2016 | Keslin | G06F 40/166 |

OTHER PUBLICATIONS

V. Herminghaus, "Disk and Storage System Basics", Storage Management in Data Centers, pp. 1-37, 2009.
A. Natanzon, et al., "Hybrid Replication: Optimizing Network Bandwidth and Primary Storage Performance for Remote Replication", Networking, Architecture and Storage (NAS), 2016 IEEE International Conference, pp. 1-8.

* cited by examiner

*Primary Examiner* — Bai D Vu
(74) *Attorney, Agent, or Firm* — William K. Konrad; Konrad Raynes Davda & Victor LLP

(57) ABSTRACT

In one embodiment, upon initiation of a consistency group, bandwidth reduction scanning logic determines whether a volume portion such as a track containing data which is to be mirrored from a primary volume to a secondary volume to form a consistency group, is allocated to the primary volume. If not, the bandwidth reduction scanning logic causes the data of the associated volume portion to not be mirrored from the primary volume to the secondary volume. As a result, the volume portion determined to not be allocated to the primary volume is bypassed by the mirroring operation, thereby reducing bandwidth usage by the mirroring and accelerating the formation of a consistency group. Other features and aspects may be realized, depending upon the particular application.

24 Claims, 6 Drawing Sheets

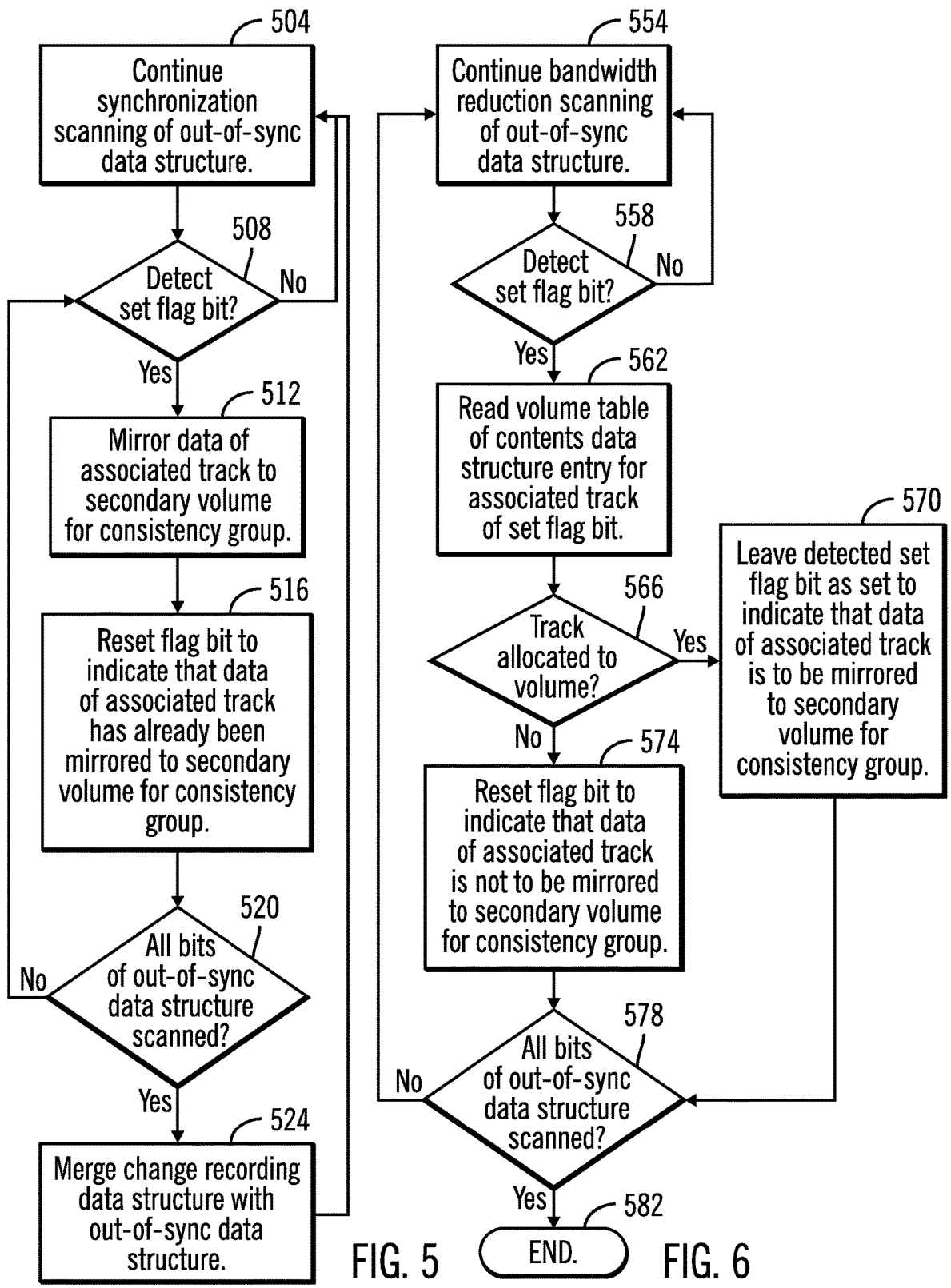

BANDWIDTH MANAGEMENT IN A DATA STORAGE SYSTEM

BACKGROUND OF THE INVENTION

1. Field of the Invention

The present invention relates to a computer program product, system, and method for bandwidth management in data storage systems.

2. Description of the Related Art

Data backup systems can provide continuous availability of production data in the event of a sudden catastrophic failure at a single point in time or data loss over a period of time. In one such disaster recovery system, production data is replicated from a local site to a remote which may be separated geographically by several miles from the local site. Such dual, mirror or shadow copies are typically made in a secondary storage device at the remote site, as the application system is writing new data to a primary storage device usually located at the local site. Different data replication technologies may be used for maintaining remote copies of data at a secondary site, such as International Business Machine Corporation's ("IBM") Metro Mirror Peer to Peer Remote Copy (PPRC), Extended Remote Copy (XRC), Coupled XRC (CXRC), Global Copy, and Global Mirror Copy.

Recovery Point Objective or RPO is frequently a very important metric to customers in a mirror environment in which the remote site is separated from the local site by a large distance. RPO is an indication of how far behind a secondary storage site is with respect to data from a primary storage site due to transmission delays and other factors. The higher the RPO the longer it can take for the system to recover at the secondary site from a disaster at the primary site. It is not uncommon that every minute operations are down or not fully recovered, can cause significant financial loss.

As a simplification, RPO can be thought of as a measure of the incoming data rate to the primary site versus outgoing data rate from the primary site to the secondary site. The outgoing data rate from the primary site to the secondary site typically is a function of the available bandwidth between the primary and secondary site and indeed is typically a major factor affecting the outgoing data rate. Bandwidth is frequently very expensive and customers often cannot afford to purchase enough bandwidth to handle peak incoming workloads. Also many customers are charged by usage and would prefer to use as little bandwidth as possible.

In data mirroring systems, data is typically maintained in volume pairs, comprising a primary volume in a primary storage device and a corresponding secondary or target volume in a secondary storage device that includes an identical copy of the data maintained in the primary volume. The primary and secondary volumes are identified by a copy relationship in which the data of the primary volume, also referred to as the source volume, is copied to the secondary volume, also referred to as the target volume. Primary and secondary storage controllers may be used to control access to the primary and secondary storage devices. In certain storage system environments, a storage controller (or a storage controller complex) comprises a plurality of storage servers that are coupled to each other. The storage controller allows host computing systems to perform input/output (I/O) operations with storage devices controlled by the storage controller, where the host computing systems are often referred to as hosts.

A data structure often referred to as a volume table of contents (VTOC) is frequently maintained for each volume of data stored in storage. The VTOC data structure for a primary volume typically includes fields which list, for example, data sets (e.g. files) stored in the primary volume, the locations of the data sets within the primary volume, and locations of free space on the primary volume. When data is to be allocated to a particular volume, the VTOC is typically updated first and the actual data is written subsequently to the volume in a "dependent write."

Certain mirroring mechanisms may control the formation of consistency groups for generating consistency copies of data. A consistency group is a collection of volumes across multiple storage units that are managed together when creating consistent copies of data. The order of dependent writes where the start of one write operation is dependent upon the completion of a previous write to a storage volume, is preserved in consistency groups. The formation of these consistency groups may be controlled by a primary storage controller which sends commands over remote copy processes and copies volumes to the secondary storage controller.

A data structure such as an out-of-synchronization (or "out-of-sync" or OOS) bitmap is frequently used to identify which tracks involved in a remote copy relationship have not yet been copied over to the secondary volume and are thus protected tracks. Each track is typically represented by one bit in the OOS bitmap. A bit is set when the corresponding track is to be copied. The bit is reset (i.e., unset) when the corresponding track has been copied from the primary storage controller to the secondary storage controller.

One known data mirroring technique is an asynchronous mirroring solution marketed by International Business Machines Corporation (IBM) as Global Mirror, which uses a two part data freeze technique to ensure data consistency. When a consistency group (CG)) is initiated, a volume moves from one consistency group (CG) to the next CG. Thus, upon initiation of a CG, the storage controller performs a "Start Increment" operation which "draws a line in the sand" such that any write operations to the primary volume before the line are in the current CG and any writes after the line will be in the next CG. Subsequent write operations to the primary volume after the line are queued in a wait queue.

When all volumes in the current consistency group have completed the Start Increment operation, the storage controller performs a "Run" operation for each volume of the current consistency group. In the Run operation, the storage controller ends the queueing of I/O operations and processes any write operations that remain on the queue. Any queued write operation is considered to be after the line and thus in the next CG. By using these two operations to freeze (that is, queue) and then unfreeze I/O, the mirroring process can ensure data consistency between volumes.

Following initiation of a CG, data locations of the primary volume represented in the OOS bitmap for the CG which have not yet been mirrored to the secondary volume of the current CG, are protected from being overwritten by write operations subsequent to the initiation of the CG, until the data has been safely mirrored to the secondary volume of the current CG. Completion of scanning of the OOS bitmap ensures that the initiated consistency group has been completed by mirroring the data from the primary to the secondary volume for each set bit of the OOS bitmap. As the data of each track associated with a set bit of the OOS bit map is successfully mirrored to the secondary volume, the associated bit of the OOS bitmap is reset. The consistency group is complete once the scanning of the OOS bitmap has been completed and all set bits have been reset.

Once the data of a particular location of the primary volume has been safely mirrored to the secondary volume of the current CG, a subsequent write operation directed to that location of the primary volume may be taken from the wait queue and permitted to proceed. The data of the subsequent write operation will be a part of the next consistency group once the next consistency group is initiated.

Once a consistency group has been initiated and is in the process of being completed, any subsequent writes to the primary volume are not recorded in the OOS bitmap but instead are recorded in a change recording (CR) bitmap. Like the OOS bitmap, the CR bitmap is a data structure having a bit for every track on the primary volume. When there is a subsequent write on a track of the primary volume after the current consistency group is initiated, then a bit is set in the CR bitmap to indicate that the track needs to be copied in a subsequent mirror operation for the next consistency group. Accordingly, upon completion of the current consistency group by mirroring the data from the primary to the secondary volume for each set bit of the OOS bitmap, the CR bitmap is merged into the OOS bitmap for copying the data of the subsequent write operations to the secondary volume for formation of the next consistency group once initiated.

SUMMARY

One general aspect of a computing environment employing bandwidth management in accordance with the present description, is directed to use with a host and data storage having a primary volume and data storage having a secondary volume. In one embodiment, bandwidth management in accordance with the present description provides a significant improvement in computer technology. For example, a significant reduction in bandwidth requirements between primary and secondary storage sites may be facilitated without a significant negative impact to the Recovery Point Objective or RPO of the system. Conversely, for a given bandwidth capability, the RPO may be significantly improved by reducing bandwidth usage in systems employing bandwidth management in accordance with the present description. Thus, a user has the option of purchasing less bandwidth to support the data backup system or improving the RPO of the system, or both.

In one embodiment, bandwidth reduction scanning logic scans an out-of-sync data structure such as an out-of-sync bitmap, for example, to detect a flag set to indicate that data stored in an associated volume portion such as a track, for example, is to be mirrored from a primary volume to a secondary volume to form a consistency group. In response to detection of a set flag by the bandwidth reduction scanning, the bandwidth reduction scanning logic determine whether the track or other volume portion storing the data associated with the set flag has been allocated to the primary volume associated with the out-of-sync data structure.

In one aspect of bandwidth management in accordance with the present description, the bandwidth reduction scanning logic resets the detected flag before the data is mirrored if it is determined that the volume portion associated with the set flag has not been allocated to the primary volume. A reset flag indicates that the data of the associated volume portion is not to be mirrored from the primary volume to the secondary volume to form a consistency group. As a result, mirroring of the data of a volume portion associated with a reset detected flag is bypassed, reducing bandwidth usage of a mirroring operation. The bandwidth reduction scanning logic continues the bandwidth reduction scanning operation until the bandwidth reduction operation scanning has completed scanning of the out-of-synchronization data structure.

In another aspect of bandwidth management in accordance with the present description, the bandwidth reduction scanning logic, in determining whether the volume portion storing the data associated with the set flag has been allocated to the primary volume, reads a snapshot of a volume table of contents (VTOC) data structure which is taken in connection with the initiation of a consistency group. In one embodiment, a volume portion such as a track, for example, listed by the VTOC data structure as free space on the primary volume at the time the consistency group is initiated, is determined to be not allocated to the primary volume. As noted above, the bandwidth reduction scanning logic resets the detected flag if it is determined that the volume portion associated with the set flag has not been allocated to the primary volume, to indicate that the data of the associated volume portion is not to be mirrored from the primary volume to the secondary volume. As a result, mirroring of the data of a volume portion associated with a reset detected flag is bypassed, reducing bandwidth usage of a mirroring operation.

In still another aspect of bandwidth management in accordance with the present description, synchronization scanning logic scans the out-of-sync data structure in parallel with the scanning of the same out-of-sync data structure by the bandwidth reduction scanning logic, to detect a flag set to indicate data stored in an associated volume portion is to be mirrored from the primary volume to the secondary volume to form a consistency group. In response to a detection of a set flag by the synchronization scanning operation, the synchronization scanning logic causes mirror logic to mirror data written to the associated volume portion of the primary volume to the secondary volume. Conversely, if a flag has been reset by the bandwidth reduction scanning operation before the synchronization scanning reaches the associated bit of the OOS bitmap, the reset flag is not detected by the synchronization scanning logic as a set flag because it has been reset by the bandwidth reduction scanning logic, and as a result, mirroring of the data of a volume portion associated with a flag reset by the bandwidth reduction scanning operation is bypassed reducing bandwidth usage by the mirroring.

In yet another aspect of bandwidth management in accordance with the present description, in response to the storage controller initiating a consistency group at a start time, the bandwidth reduction scanning logic initiates the bandwidth reduction scanning of the out-of-sync data structure, while the storage controller queues subsequent write operations to the primary volume in a queue until synchronization scanning by the synchronization scanning logic has completed scanning of the out-of-sync data structure and the initiated consistency group is completed. In this manner, consistency between the primary and secondary volumes of the consistency group may be facilitated.

Implementations of the described techniques may include hardware, a method or process, or computer software on a computer-accessible medium. Other features and aspects may be realized, depending upon the particular application.

BRIEF DESCRIPTION OF THE DRAWINGS

FIG. 5 illustrates an example of operations of synchronization scanning logic operating in parallel with bandwidth reduction scanning logic of the storage controller of the computing environment of FIG. 1 employing bandwidth management in accordance with one aspect of the present description.

FIG. 6 illustrates an example of operations of bandwidth reduction scanning logic of the storage controller of the computing environment of FIG. 1, employing bandwidth management in accordance with one aspect of the present description.

DETAILED DESCRIPTION

Figure 1:
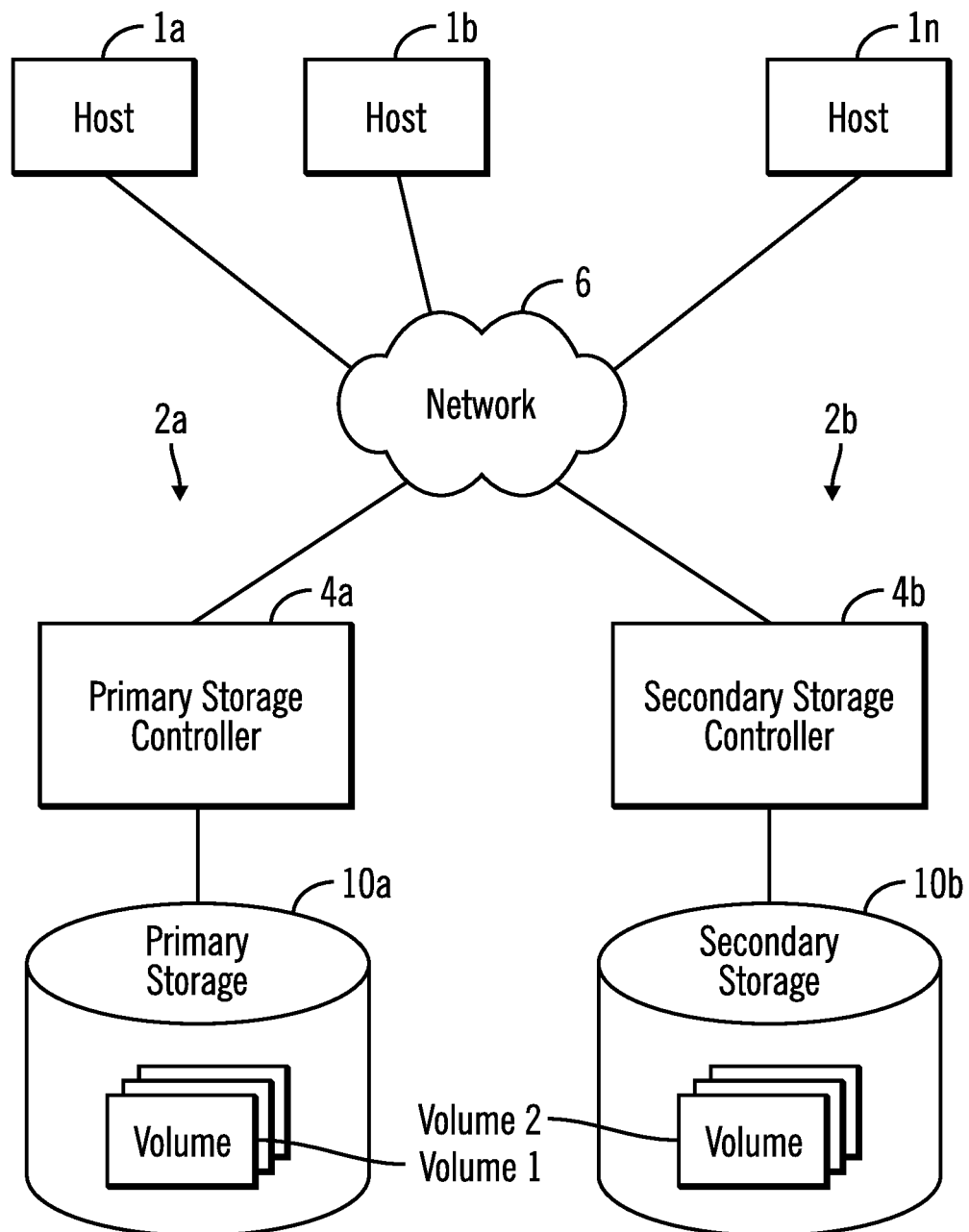
FIG. 1 illustrates an embodiment of a computing environment employing bandwidth management in a data storage system in accordance with one aspect of the present description.

Bandwidth management in accordance with the present description provides a significant improvement in computer technology. For example, in one embodiment, a significant reduction in bandwidth requirements between primary and secondary storage sites is facilitated in a data storage environment in which data is mirrored from a primary volume at the primary storage site to a secondary volume at a secondary storage site. It is appreciated that bandwidth management in accordance with the present description which permits significant reduction in bandwidth requirements is of significant value in such embodiments.

In addition, the formation of consistency groups is accelerated such that the Recovery Point Objective or RPO of the system is significantly improved in such embodiments. Thus, a customer employing bandwidth management in accordance with the present description has the option of purchasing less bandwidth to support the data backup system or improving the RPO of the system, or both.

In one embodiment, upon initiation of a consistency group which includes a primary volume and a secondary volume, bandwidth reduction scanning logic scans an out-of-sync data structure such as an out-of-sync bitmap, for example, to detect a flag set to indicate that data stored in an associated volume portion such as a track, for example, is to be mirrored from a primary volume to a secondary volume to form a consistency group.

In addition, in another aspect of bandwidth management in accordance with the present description, synchronization scanning logic scans the same out-of-sync data structure in parallel with the scanning of the same out-of-sync data structure by the bandwidth reduction scanning logic, to detect a flag set to indicate data stored in an associated volume portion is to be mirrored from the primary volume to the secondary volume to form a consistency group. In response to a detection of a set flag by the synchronization scanning operation, the synchronization scanning logic causes mirror logic to mirror data written to the associated volume portion of the primary volume to the secondary volume.

In response to detection by the bandwidth reduction scanning of a set flag, the bandwidth reduction scanning logic determines whether the track or other volume portion storing the data associated with the set flag has been allocated to the primary volume associated with the out-of-sync data structure. In one embodiment, the bandwidth reduction scanning logic, in determining whether the volume portion storing the data associated with the set flag has been allocated to the primary volume, reads a volume table of contents (VTOC) data structure. For example, a volume portion such as a track, for example, listed by the VTOC data structure as free space on the primary volume is determined to be not allocated to the primary volume.

In one embodiment, a copy of the VTOC is stored in a suitable location such as bind segments of a cache which are not controlled by the cache, when the consistency group is initiated. In this manner, the cache copy of the volume table of contents data structure provides a snapshot of the state of the volume table of contents data structure at the time when the consistency group was initiated. Hence any changes to the volume table of contents for the primary volume which occur after the consistency group is initiated, will not affect the snapshot copy of the volume table of contents in the cache. For example, in the event that tracks of the primary volume are allocated or de-allocated and the volume table of contents for the primary volume stored in storage is updated subsequent to the initiation of the consistency group, such subsequent allocations or deallocations and VTOC updates do not affect the bandwidth reduction scanning by the bandwidth reduction scanning logic since the volume table of contents read by the bandwidth scanning logic is the cache snapshot copy of the volume table of contents taken at the time the consistency group was initiated. A VTOC typically occupies one track per volume so if a thousand volumes are being processed in a particular consistency group, the bind segments of the cache occupied by the thousand VTOC snapshots for those thousand volumes may be on the order of as few as 56 MB of data, a relatively small amount of data.

In one aspect of bandwidth management in accordance with the present description, the bandwidth reduction scanning logic resets the detected flag if it is determined that the volume portion associated with the set flag has not been allocated to the primary volume. A reset flag indicates that the data of the associated volume portion is not to be mirrored from the primary volume to the secondary volume to form a consistency group. As a result, if a flag has been reset by the bandwidth reduction scanning operation before the associated bit is reached by the synchronization scanning logic, the reset flag is not detected as a set flag by the synchronization scanning logic operating in parallel so that mirroring of the data of a volume portion associated with a flag reset by the bandwidth reduction scanning operation is bypassed, reducing bandwidth usage by the mirroring and accelerating the formation of a consistency group. The bandwidth reduction scanning logic continues the bandwidth reduction scanning operation until the bandwidth reduction operation scanning has completed scanning of the out-of-synchronization data structure.

In yet another aspect of bandwidth management in accordance with the present description, in response to the storage controller initiating a consistency group at a start time, the bandwidth reduction scanning logic initiates the bandwidth reduction scanning of the out-of-sync data structure, and the storage controller queues subsequent write operations to the primary volume in a queue. Any subsequent writes to the primary volume are recorded in a change recording (CR) bitmap or data structure until synchronization scanning by the synchronization scanning logic has completed scanning of the out-of-sync data structure and the initiated consistency group is completed.

Because a subsequent write on a track of the source primary volume after the current consistency group is initiated, is recorded in the CR bitmap instead of the OOS bitmap being scanned by the bandwidth reduction scanning logic, scanning of the OOS bitmap by the bandwidth reduction scanning logic is not affected by a subsequent write on a track of the source primary volume after the current consistency group is initiated. Once the current consistency group is completed, the change recording (CR) bitmap is merged with the out-of-sync bitmap for the formation of the next consistency group.

Implementations of the described techniques may include hardware, a method or process, or computer software on a computer-accessible medium.

It is seen from the above that a data storage system employing bandwidth management in accordance with the present description, in one embodiment, reduces bandwidth requirements for connecting a local storage site to a remote storage site, and accelerates the formation of consistency groups to improve Recovery Point Objective or RPO of the system. Other aspects and advantages may be realized, depending upon the particular application.

A system of one or more computers may be configured for bandwidth management in a data storage system in accordance with the present description, by virtue of having software, firmware, hardware, or a combination of them installed on the system that in operation causes or cause the system to perform bandwidth management in accordance with the present description. For example, one or more computer programs may be configured to perform bandwidth management in a data storage system by virtue of including instructions that, when executed by data processing apparatus, cause the apparatus to perform the actions.

The operations described herein are performed by logic which is configured to perform the operations either automatically or substantially automatically with little or no system operator intervention, except where indicated as being performed manually. Thus, as used herein, the term "automatic" includes both fully automatic, that is operations performed by one or more hardware or software controlled machines with no human intervention such as user inputs to a graphical user selection interface. As used herein, the term "automatic" further includes predominantly automatic, that is, most of the operations (such as greater than 50%, for example) are performed by one or more hardware or software controlled machines with no human intervention such as user inputs to a graphical user selection interface, and the remainder of the operations (less than 50%, for example) are performed manually, that is, the manual operations are performed by one or more hardware or software controlled machines with human intervention such as user inputs to a graphical user selection interface to direct the performance of the operations.

Many of the functional elements described in this specification have been labeled as "logic," in order to more particularly emphasize their implementation independence. For example, a logic element may be implemented as a hardware circuit comprising custom VLSI circuits or gate arrays, off-the-shelf semiconductors such as logic chips, transistors, or other discrete components. A logic element may also be implemented in programmable hardware devices such as field programmable gate arrays, programmable array logic, programmable logic devices or the like.

A logic element may also be implemented in software for execution by various types of processors. A logic element which includes executable code may, for instance, comprise one or more physical or logical blocks of computer instructions which may, for instance, be organized as an object, procedure, or function. Nevertheless, the executables of an identified logic element need not be physically located together, but may comprise disparate instructions stored in different locations which, when joined logically together, comprise the logic element and achieve the stated purpose for the logic element.

Indeed, executable code for a logic element may be a single instruction, or many instructions, and may even be distributed over several different code segments, among different programs, among different processors, and across several memory devices. Similarly, operational data may be identified and illustrated herein within logic elements, and may be embodied in any suitable form and organized within any suitable type of data structure. The operational data may be collected as a single data set, or may be distributed over different locations including over different storage devices.

Figure 2:
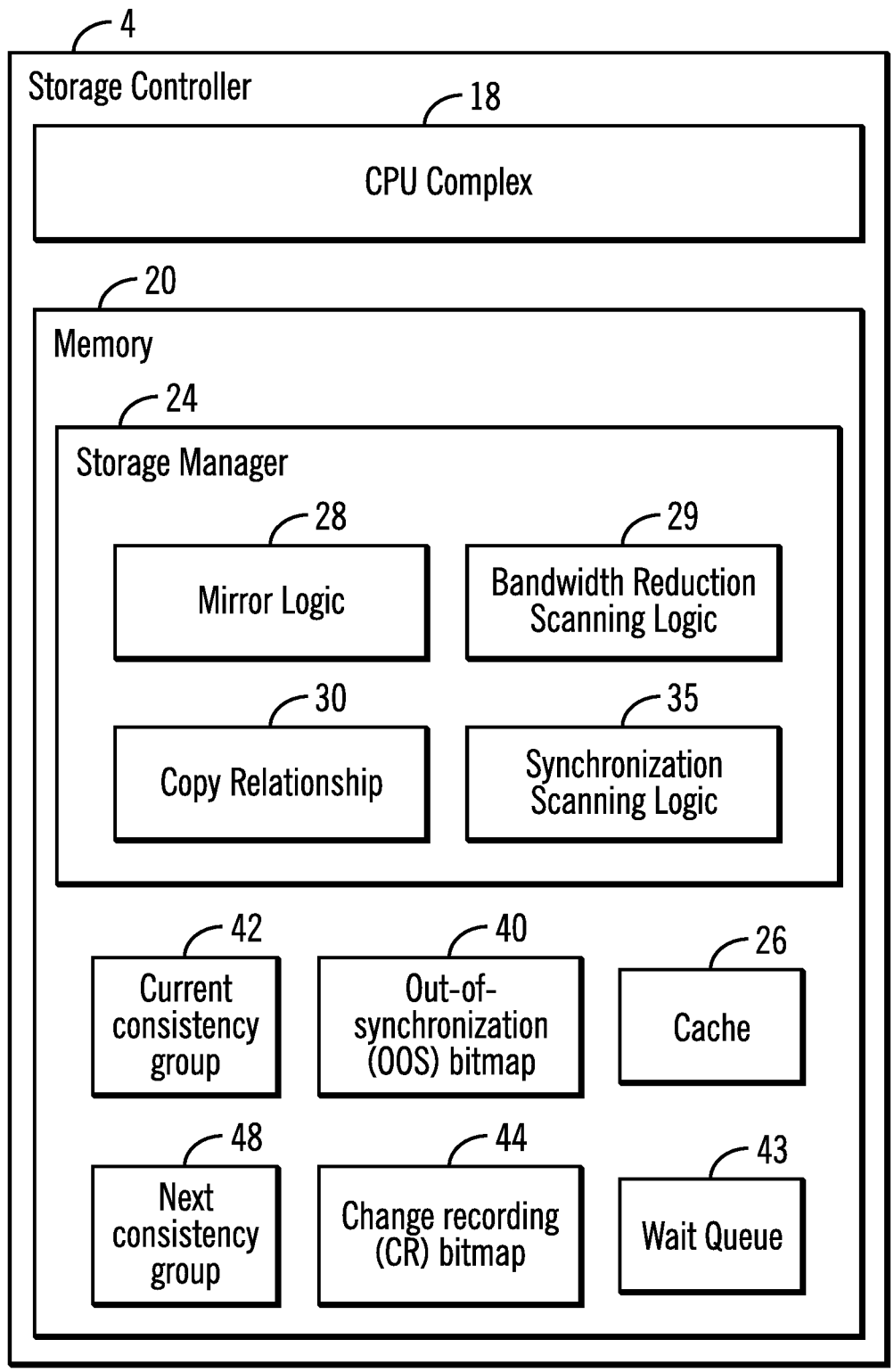
FIG. 2 illustrates an example of a storage controller of the computing environment of FIG. 1, employing bandwidth management in accordance with one aspect of the present description.
Figure 3:
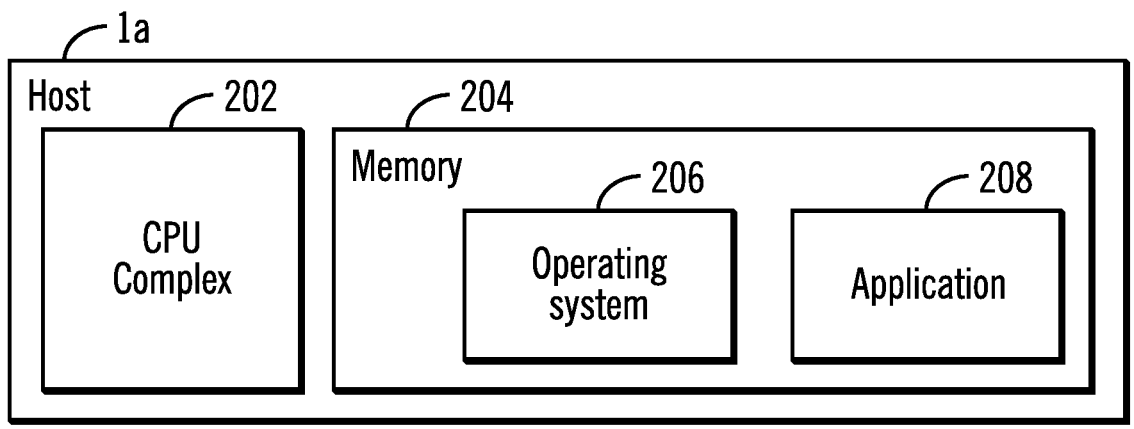
FIG. 3 illustrates an example of a host of the computing environment of FIG. 1.

FIGS. 1-3 illustrate an embodiment of a computing environment employing bandwidth management in a data storage system in accordance with the present description. A plurality of hosts 1a (FIGS. 1, 3), 1b . . . 1n may submit Input/Output (I/O) requests over a network 6 to one or more data storage devices or systems 2a, 2b, to read or write data. The hosts 1a, 1b . . . 1n may be separate physical devices or may be virtual devices implemented using assigned resources of partitions of a server, for example. In a similar manner, the data storage systems 2a, 2b may be separate physical devices or may be virtual devices implemented using assigned resources of partitions one or more servers, for example.

In the illustrated embodiment, the data storage system 2a is a primary data storage system and the data storage system 2b is a secondary data storage system in which data stored on the primary data storage system 2a by a host is mirrored to the secondary data storage system 2b. Although the embodiment depicted in FIG. 1 depicts a single secondary data storage system 2b, it is appreciated that a primary data storage system 2a may have more than one secondary data storage system.

Each data storage system 2a, 2b includes a storage controller or control unit 4a, 4b, respectively, an example of which is shown in greater detail in FIG. 2 as storage controller 4, which accesses data stored in multiple data storage units of storage 10a, 10b, respectively. It is appreciated that one or more other data storage units of the storage 10a, 10b may comprise any suitable device capable of storing data, such as physical hard disks, solid state drives, tape drives, etc., known in the art. Thus, in one embodiment, the storage 10a, 10b may be further comprised of one or more sequential access storage devices, such as hard disk drives and magnetic tape drives or may include non-sequential access storage devices such as solid state drives (SSD), for example. Such additional devices of storage 10a, 10b may comprise a single sequential or non-sequential access device for data storage or may comprise an array of devices for data storage, such as a Just a Bunch of Disks (JBOD), Direct Access Storage Device (DASD), Redundant Array of Independent Disks (RAID) array, virtualization device, tape storage, flash memory, etc.

In certain embodiments additional storage units may be disks, for example, that are configured as a Redundant Array of Independent Disk (RAID) storage arrays in which one or more RAID storage array is an array of hard disks in a RAID configuration to facilitate data recovery in the event of loss of a hard disk. RAID storage units of the storage 10a, 10b may also be other types of storage such as solid state drives in a RAID configuration to facilitate data recovery in the event of loss of a solid state drive. The storage units of the storage 10a, 10b may be configured to store data in subunits of data storage such as volumes, tracks, etc.

Each storage controller 4 (FIG. 2), 4a, 4b includes a CPU complex 18 (FIG. 2) having processor resources provided by one or more processors or central processing units, each having a single or multiple processor cores. In this embodiment, a processor core contains the components of a CPU involved in executing instructions, such as an arithmetic logic unit (ALU), floating point unit (FPU), and/or various levels of cache (such as L1 and L2 cache), for example. It is appreciated that a processor core may have other logic elements in addition to or instead of those mentioned herein.

Each storage controller 4 (FIG. 2), 4a, 4b further has a memory 20 that includes a storage manager 24 for managing storage operations including writing data to or reading data from a storage unit of an associated storage 10a, 10b in response to an I/O data request from a host or mirrored data from another data storage system. A cache 26 of the memory 20 may comprise one or more of different types of memory, such as RAMs, write caches, read caches, non-volatile storage (NVS), etc. The different types of memory that comprise the cache may interoperate with each other. The CPU complex 18 of each storage controller 4 (FIG. 2), 4a, 4b may have multiple clusters of processors, each cluster having its own assigned memory 20, storage manager 24, cache, etc. The processing and memory resources assigned each cluster may be physical, virtual, shared, transferable or dedicated, depending upon the particular application.

In the illustrated embodiment, the storage manager 24 includes mirror logic 28 that is configured to execute in the primary storage controller 4a (FIG. 1) and perform copy operations to copy tracks or other portions of storage volumes from the primary storage controller 4a to the secondary storage controller 4b in a consistent manner. For example, a primary-secondary pair of volumes, volume1, volume2 are in an asynchronous copy or mirror relationship 30 such that updates to the primary volume1 are asynchronously mirrored to each secondary volume2. As explained in greater detail below, in accordance with one aspect of bandwidth management of the present description, the storage manager 24 further includes bandwidth reduction scanning logic 29 which is configured to reduce the bandwidth utilized by the mirror logic 28 to copy tracks of storage volumes from the primary storage controller 4a to the secondary storage controller 4b in a consistent manner to form consistency groups.

In the illustrated embodiment, a copy relationship is represented by a data structure as represented by the copy relationships 30 of the memory 20 of FIG. 2. Thus, one or more copy relationships 30, which may be maintained by the mirror logic 28 for the primary and secondary storage controllers 4a, 4b, (FIG. 1) associate primary storage locations in the primary storage 10a and corresponding secondary storage locations in each of the secondary storage drives as represented by the storage 10b of the mirror relationship, such that updates to locations of the primary storage 10a are mirrored, that is, copied to the corresponding locations of the secondary storage 10b. For example, source storage locations in a primary storage volume1 (FIG. 1) of storage 10a may be asynchronously mirrored in a mirror operation to target storage locations of a secondary volume2 of the storage 10b pursuant to a mirror copy relationship 30 (FIG. 2). Similarly, source storage locations in the primary storage volume1 (FIG. 3) of storage 10a may be asynchronously mirrored in a mirror operation to additional target storage locations of another secondary volume2 of another secondary data storage system pursuant to a mirror copy relationship 30 (FIG. 2).

In the illustrated embodiment, a copy relationship 30 comprises an asynchronous mirror relationship for a pair of storage locations in which updates to the primary (source) storage locations of the mirror relationship 30 are asynchronously mirrored to the secondary (target) storage locations of the mirror relationship 30. It is appreciated that other types of copy relationships such as synchronous, for example, may be established, depending upon the particular application.

In the configuration illustrated in FIG. 1, the storage controller 4a and the data storage 10a have been configured as a primary storage control unit and the primary storage, respectively, of a primary data storage system 2a. Similarly, the storage controller 4b and its data storage 10b have been configured as a secondary storage control unit and a secondary storage, respectively, of a secondary data storage system 2b. Hence, in the configuration depicted in FIG. 1, the storage controller 4a will be referred to as a primary storage controller or control unit 4a, and the data storage 10a will be referred to as a primary storage 10a. Similarly, the storage controller or control unit 4b will be referred to as a secondary storage controller or control unit 4b and the data storage 10b will be referred to as a secondary data storage 10b. In this embodiment, there may be multiple secondary data storages such that a copy relation can be in a one to many relationship, which is also referred to as a multi-target relationship.

The primary storage controller 4a is located at a first site and the secondary storage controller 4b is located at a second site which may be geographically or functionally remote from the first site. Thus, in this example, the first site may be at a local site and the second site may be at geographically remote sites separated by a short or long geographical distance from the local site and from each other. Alternatively, the local and remote site may be relatively close such as in different buildings in the same general geographical location, in different rooms of the same building, in different machines in the same room, or in different portions or partitions of the same machine, of the network 6.

In the illustrated embodiment, the mirror logic 28 cooperates with synchronization scanning logic 35 configured to scan an out-of-synchronization data structure such as an out-of-synchronization (OOS) bitmap 40 that indicates tracks to be copied from the primary storage controller 4a to the secondary storage controller 4b in the current formation of a consistency group 42. One mode of the synchronous scanning logic 35 managing the copy relationships, may be implemented with asynchronous copy operations, such as a IBM's Global Mirror program modified as appropriate in accordance with present description. The described operations may be implemented with other programs such as other copy programs or other recovery programs modified as appropriate in accordance with present description.

In the illustrated embodiment, the bitmap 40 is a data structure maintained in the memory 20 by the mirror logic 28. In this embodiment, each bit of the OOS bitmap 40 of the memory 20 corresponds to a track of a storage volume. If a bit is determined by the synchronization scanning logic 35 to be set (e.g., is assigned to 1) then the set bit functions as a flag set to indicate that the corresponding track is to be copied by the mirror logic 28 from the primary storage controller 4a to the secondary storage controller 4b. If a bit is determined by the synchronization scanning logic 35 to not be set (i.e., unset or reset and is, for example, assigned to 0) then the corresponding track need not be copied by the mirror logic 28 from the primary storage controller 4a to the secondary storage controller 4b to complete a consistency group for data synchronization. In the illustrated embodiment, the current consistency group 42 is represented by a data structure which is maintained in the memory 20 by the mirror logic 28.

In one aspect of the present description, the bandwidth reduction scanning logic 29 is configured to scan the out-of-sync bitmap 40 for a primary volume in parallel with the scanning of the same out-of-sync bitmap 40 by the synchronization scanning logic 35 for the formation of a consistency group which includes the primary volume associated with the bitmap 40. The bandwidth reduction scanning logic 29 scans the out-of-sync bitmap 40 for the primary volume forming a consistency group to detect a flag set to indicate that data stored in an associated track or other volume portion of the primary volume, is to be mirrored from the primary volume to its associated secondary volume to form a consistency group.

The bandwidth reduction scanning logic 29 is further configured to, in response to a detection of a set flag by the bandwidth reduction scanning, determine whether the track associated with the set flag has been allocated to the primary volume associated with the out-of-sync bitmap 40. As explained in greater detail below, the bandwidth reduction scanning logic can determine whether the track storing the data associated with the set flag has been allocated to the primary volume by, in one embodiment, examining a volume table of contents (VTOC) data structure or other similar data structure having fields which list, for example, data sets (e.g. files) stored in the primary volume, the locations of the data sets within the primary volume, and locations of free space on the primary volume. Thus, in one embodiment, the bandwidth reduction scanning logic 29 is further configured to, in determining whether a track (or other volume portion) storing the data associated with the set flag has been allocated to the primary volume, read the volume table of contents data structure for the primary volume. In this example, a track or other volume portion location listed as free space on the primary volume is determined to be not allocated to the primary volume.

The volume table of contents data structure for the primary volume read by the bandwidth reduction scanning logic 29 is in one embodiment, a copy of the volume table of contents maintained in storage for the primary volume. Thus, in one embodiment, the bandwidth reduction scanning logic 29 is be configured to initiate bandwidth reduction scanning by copying the volume table of contents data structure for the primary volume to the cache 26 in response to initiation of a consistency group which includes the primary volume.

In another aspect of the present description, the bandwidth reduction scanning logic 29 is further configured to, in response to a determination that the track or volume portion associated with the set flag has not been allocated to the primary volume, reset the detected flag of the out-of-sync bitmap (OOS) bitmap 40 to indicate that the data of the associated volume portion is not to be mirrored from the primary volume to the secondary volume to form a consistency group. As previously mentioned, the synchronization scanning logic 35 scans the out-of-sync bitmap 40 in parallel with the scanning of the out-of-sync bitmap 40 by the bandwidth reduction scanning logic 29, to detect a flag set to indicate data stored in an associated track is to be mirrored from the primary volume to the secondary volume to form a consistency group. Thus, in response to a detection by the synchronization scanning logic 35 of a set flag, the data written to the associated track of the primary volume is mirrored to the secondary. By comparison, a flag reset by the bandwidth reduction scanning logic 29 prior to being scanned by the synchronization scanning logic 35, is not detected as a set flag by the synchronization scanning logic 35. As a result, mirroring of the data of a volume portion associated with a flag reset by the bandwidth reduction scanning operation is bypassed.

In this manner, mirroring of the data of a volume portion associated with a reset detected flag is bypassed, resulting in a reduction in bandwidth usage of a mirroring operation. In addition, a consistency group may be completed more quickly by bypassing the mirroring of tracks or other volume portions which are determined to be not allocated to the particular primary volume of the consistency group.

In the illustrated embodiment, the storage controller is further configured to initiate a consistency group at a particular time which is referred to herein as a "consistency group start time." The bandwidth reduction scanning logic is further configured to, in response to initiation of a consistency group, to initiate the bandwidth reduction scanning of the out-of-sync data structure as described above.

Any further write operations received after the consistency group start time for a particular consistency group, will belong to the next consistency group. Accordingly, to facilitate the formation of a consistency group once the formation has been initiated, in one embodiment, the storage controller is further configured to queue any further write operations to the primary volume in a wait queue 43, to ensure that data locations of the primary volume represented by the OOS bitmap 40 which have not yet been mirrored to the secondary volume of the current consistency group, are protected from being overwritten by subsequent write operations until the data has been safely mirrored to the secondary volume of the current consistency group. Completion of scanning of the OOS bitmap 40 by the synchronization scanning logic ensures that the initiated consistency group has been completed by mirroring the data from the primary to the secondary volume for each set bit of the OOS bitmap 40 which have not been reset by the bandwidth reduction scanning logic 29.

In one embodiment, once the data of a particular location of the primary volume has been safely mirrored to the secondary volume of the current consistency group, a subsequent write operation directed to that location of the primary volume for the next consistency group, may be taken from the wait queue and permitted to proceed. The data of the subsequent write operation will be a part of the next consistency group once the next consistency group is initiated.

In addition to the OOS bitmap 40, a change recording (CR) bitmap 44 is maintained in the primary storage controller 4a. In the illustrated embodiment, the bitmap 44 like the bitmap 40 is a data structure maintained in the memory 20 by the mirror logic 28. In existing mechanisms, the CR bitmap 44 indicates the tracks to be copied for the next consistency group 48. In existing mechanisms, when new writes on tracks are received and executed as the current consistency group 42 is being copied using the OOS bitmap 40, then bits corresponding to these subsequently written tracks are set in the CR bitmap 44 instead of the OOS bitmap 40 as these tracks will be in the next consistency group to be copied over to the secondary storage controller 4b. When the mirroring for the current consistency group 42 has been completed, then the CR bitmap 44 is switched into the OOS bitmap 40 for copying the next consistency group 48 that was being stored in the CR bitmap 44.

In the illustrated embodiment, the storage manager 24 including the bandwidth reduction scanning logic 29 is depicted as software stored in the memory 20 and executed by the CPU complex 18. However, it is appreciated that the logic functions of the storage manager 24 may be implemented as hardware, software, firmware or combinations of one or more thereof, depending upon the particular application.

The storage manager 24 (FIG. 2) in one embodiment stores data in the cache and transfers data between the cache and storage 10a, 10b (FIG. 1) in tracks. Similarly, the storage manager 24 (FIG. 2) in one embodiment transfers data from the primary storage 10a (FIG. a) to a secondary storage 10b in tracks. As used herein in one embodiment, the term track refers to a subunit of data or storage of a disk storage unit, a solid state storage unit or other types of storage units. In addition to tracks, storage units may have other subunits of storage or data such as a bit, byte, word, segment, page, block (such as a Logical Block Address (LBA)), cylinder, segment, extent, volume, logical device, etc. or any portion thereof, or other subunits suitable for transfer or storage. Thus, as used herein, a segment is a subunit of a track. Accordingly, the size of subunits of data processed in input/output operations in accordance with the present description may vary, depending upon the particular application. Thus, as used herein, the term "track" or the term "segment" refers to any suitable subunit of data storage or transfer.

The system components 1a (FIG. 1), 1b . . . 1n, 4 (FIG. 2), 6 are connected to a network 6 which enables communication among these components. Thus, the network includes a fabric which may comprise a Storage Area Network (SAN), Local Area Network (LAN), Intranet, the Internet, Wide Area Network (WAN), peer-to-peer network, wireless network, arbitrated loop network, etc. Communication paths from the storage subsystems to the hosts 1a, 1b, . . . 1n may be based upon a particular host attachment protocol such as Fibre Connection (FICON), for example. Other communication paths of the fabric may comprise for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

Communication software associated with the communication paths includes instructions and other software controlling communication protocols and the operation of the communication hardware in accordance with the communication protocols, if any. It is appreciated that other communication path protocols may be utilized, depending upon the particular application.

A typical host as represented by the host 1a of FIG. 3 includes a CPU complex 202 and a memory 204 having an operating system 206 and an application 208 that cooperate to read data from and write data updates to the storage 10a, 10b via a storage controller 4, 4a, 4b. An example of a suitable operating system is the z/OS operating system. It is appreciated that other types of operating systems may be employed, depending upon the particular application.

Figure 4:
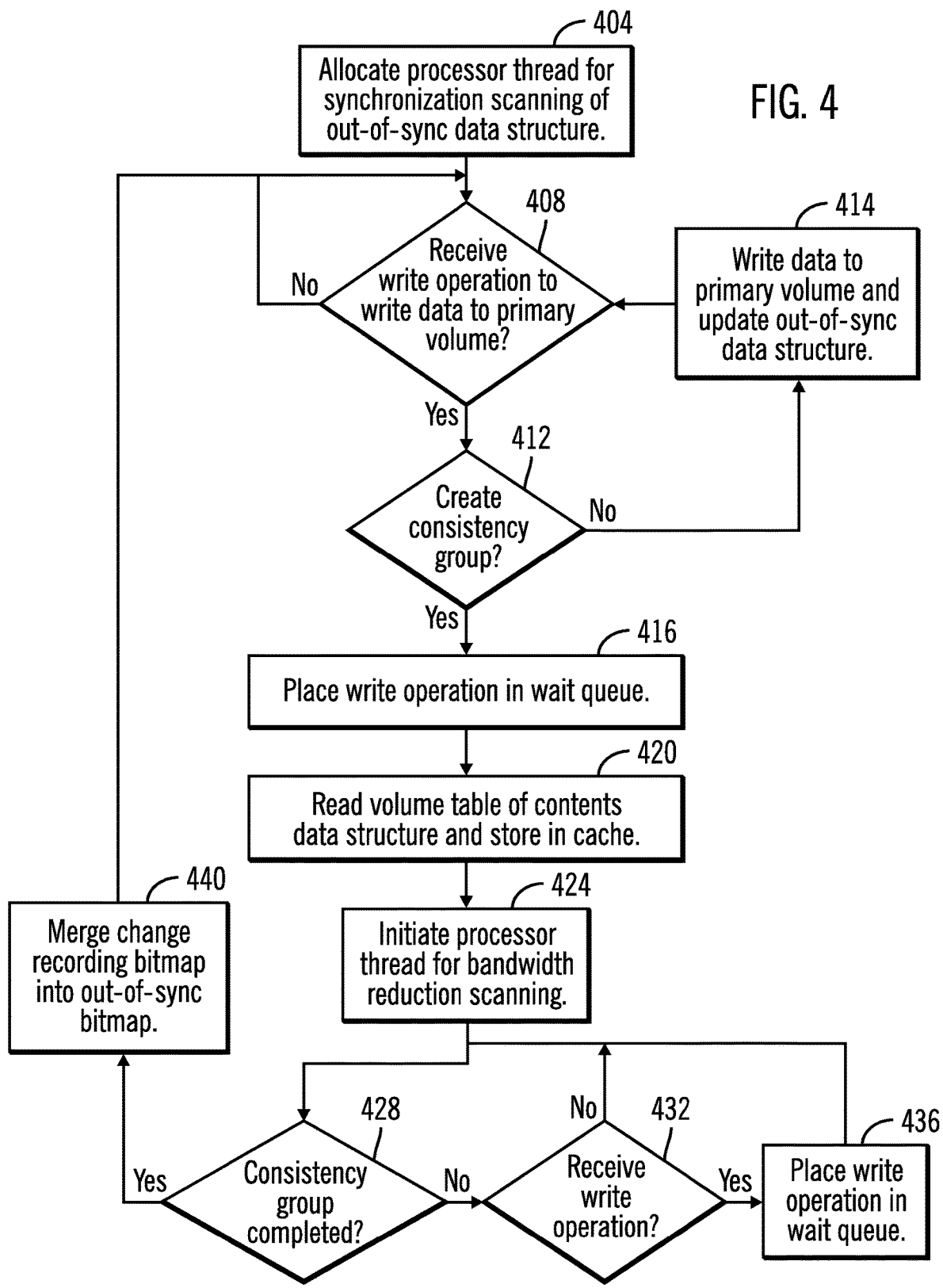
FIG. 4 illustrates an example of operations of a storage controller of the computing environment of FIG. 1, employing bandwidth management in accordance with one aspect of the present description.

FIG. 4 illustrates an example of operations of a storage controller of the computing environment of FIG. 1, employing bandwidth management in accordance with one aspect of the present description. In this embodiment, the mirror logic 28 of the storage manager 24 (FIG. 2) allocates (block 404, FIG. 4) a processor thread for synchronization scanning of the out-of-sync bitmap 40 to mirror data from the primary volume to a secondary volume. In one embodiment one thread per logical storage system is allocated. As described in greater detail in connection with FIG. 5, synchronization scanning logic scans an out-of-sync data structure such as the out-of-sync bitmap 40, in parallel with scanning by bandwidth reduction scanning logic 29, to detect a flag which has been set to indicate data stored in an associated volume portion is to be mirrored from the primary volume to the secondary volume.

In connection with receipt (block 408, FIG. 4) from a host by the storage controller of a write operation to write data in the primary volume, a determination is made (block 412) by the storage manager 24 (FIG. 2) as to whether a consistency group is to be initiated. If not, the write operation is executed, writing (block 414) the data of the write operation to the primary volume and updating the out-of-sync bitmap 40 by setting a bit which when set, represents a set flag which indicates that the data of an associated volume portion of the primary volume is to be mirrored from the primary volume to the secondary volume.

Conversely, if it is determined (block 412) that a consistency group is to be initiated, execution of the write operation is deferred, placing (block 416) the write operation in a wait queue such as the wait queue 43 (FIG. 2). In addition, the storage controller reads (block 420) from storage a copy of the volume table of contents data structure for the primary volume in its current state as of the initiation of the consistency group and stores it in a suitable location such as the cache 26. Thus, the cache copy of the volume table of contents data structure provides a snapshot of the state of the volume table of contents data structure at the time when the consistency group was initiated. Hence any changes or updates to the volume table of contents for the primary volume which occur after the consistency group is initiated, will not affect the snapshot copy of the volume table of contents in the cache.

As described above, in one embodiment, a volume table of contents data structure has fields which lists data sets stored in the primary volume, the locations of the data sets within the primary volume, and locations of free space on the primary volume. In this embodiment, a track or other volume portion location listed in the cache snapshot copy of the VTOC as free space on the primary volume is deemed to be not allocated to the primary volume. In the event that tracks of the primary volume are allocated or de-allocated and the volume table of contents for the primary volume stored in storage is updated subsequent to the initiation of the consistency group, such subsequent allocations or deallocations and VTOC updates do not affect the bandwidth reduction scanning by the bandwidth reduction scanning logic since the volume table of contents to be read by the bandwidth scanning logic as described below, is the cache snapshot copy of the volume table of contents taken at the time the consistency group was initiated.

Having obtained the cache copy snapshot of the VTOC at the time of initiation of the consistency group, the storage controller allocates and initiates (block 424) another processor thread to initiate the bandwidth reduction scanning operation for the primary volume, which as described in greater detail in connection with FIG. 6, operates in parallel with the synchronization scanning of FIG. 5, and scans the same out-of-sync data structure 40 to detect a flag which has been set to indicate data stored in an associated track or other volume portion which is to be mirrored from the primary volume to the secondary volume of the copy relationship.

In one embodiment one thread per logical storage system is allocated. It is appreciated that the number of threads allocated may vary, depending upon the particular application.

As described below in connection with FIG. 6, in response to a detection of a set flag by the bandwidth reduction scanning operation, the bandwidth reduction scanning logic determines from the volume table of contents whether the volume portion storing the data associated with the set flag has been allocated to the primary volume. If not, the bandwidth reduction scanning logic resets the detected flag to indicate that the data of the associated volume portion is not to be mirrored from the primary volume to the secondary volume. As a result, mirroring of the data of a volume portion associated with a reset detected flag is bypassed, reducing bandwidth usage of a mirroring operation by the synchronization scanning logic.

If the consistency group has not yet been completed (block 428), any further write operations received (block 432) are placed (block 436) in the wait queue to defer execution to protect the data yet to be mirrored to the secondary volume to complete the consistency group. As described in greater detail below in connection with FIG. 5, the current consistency group is completed once all bits of the out-of-sync bitmap 40 have been scanned and processed by the synchronization scan. Once the current consistency group is completed (block 428, FIG. 4), the change recording (CR) bitmap 44 is merged (block 440) with the out-of-sync bitmap 40 and the storage controller awaits (block 408) the next write operation for the next consistency group to be formed in the manner described above. As described in greater detail below in connection with FIG. 7, when there is a write on a track of the source primary storage volume after the current consistency group is initiated, then a bit is set in the CR bitmap to indicate that the track needs to be copied in the subsequent remote copy for the next consistency group. Because a subsequent write on a track of the source storage volume after the current consistency group is initiated is recorded in the CR bitmap instead of the OOS bitmap being scanned by the bandwidth reduction scanning logic, scanning of the OOS bitmap by the bandwidth reduction scanning logic is not affected by a subsequent write on a track of the source storage volume after the current consistency group is initiated. Once the current consistency group is completed (block 428, FIG. 4), the change recording (CR) bitmap 44 is merged (block 440) with the out-of-sync bitmap 40 for the formation of the next consistency group.

FIG. 5 illustrates an example of operations of a storage controller of the computing environment of FIG. 1, in performing synchronization scanning of the out-of-sync bitmap 40 in an embodiment employing bandwidth management in accordance with one aspect of the present description. As described above, once a consistency group is to be formed, bandwidth reduction scanning of the same out-of-sync bitmap 40 is initiated to operate in parallel with the synchronization scanning depicted in FIG. 5.

As the synchronization scanning of the out-of-sync bitmap 40 by the synchronization scanning logic 35 (FIG. 2) continues (block 504), a bit of the out-of-sync bitmap 40 which has been set as a flag may be detected (block 508) by the synchronization scanning logic 35. As previously mentioned, a bit which has been set as a flag indicates that data stored in an associated track or other volume portion is to be mirrored from the primary volume to the secondary volume toward the eventual formation of a consistency group. Thus, in response to a detection of a set flag by the synchronization scanning operation, mirror logic 28 (FIG. 2) mirrors (block 512) data written to the associated volume portion of the primary volume to the secondary volume. Conversely, if a flag bit has been reset by the bandwidth reduction scanning operation, such that the reset flag bit is not detected as a set flag bit by the synchronization scanning operation, mirroring of the data of the volume portion associated with the flag reset by the bandwidth reduction scanning operation is bypassed, thereby reducing bandwidth usage by the mirror logic and accelerating formation of the consistency group. If a set flag bit is not detected, scanning of the out-of-sync bitmap by the synchronization scanning logic continues (block 504, FIG. 5).

Upon completion of the mirroring (block 512) of data written to the associated volume portion of the primary volume to the secondary volume in response to detection of a set flag bit, the detected flag bit is reset (block 516) by the synchronization scanning logic 35 to indicate that the data of the associated volume portion has already been mirrored to the secondary volume. The synchronization scanning logic 35 determines (block 520) whether all bits of the out-of-sync bitmap 40 have been scanned. If so, the current consistency group is completed and the change recording (CR) bitmap 44 is merged (block 524) with the out-of-sync bitmap 40 for formation of the next consistency group. Conversely, if all bits of the out-of-sync bitmap 40 have not been scanned by the synchronization scanning logic, scanning of the out-of-sync bitmap by the synchronization scanning logic continues (block 504, FIG. 5).

FIG. 6 illustrates an example of operations of a storage controller of the computing environment of FIG. 1, in performing bandwidth reduction scanning of the out-of-sync bitmap 40 in an embodiment employing bandwidth management in accordance with one aspect of the present description. As described above, once a consistency group is initiated, bandwidth reduction scanning of the same out-of-sync bitmap 40 is initiated to operate in parallel with the synchronization scanning depicted in FIG. 5.

In one embodiment, the bandwidth reduction scanning logic 29 is configured to determine the current scanning location of the out-of-sync bitmap 40 by the synchronization scanning operation of the synchronization scanning logic 35, and initiate the bandwidth reduction scanning operation at a scanning location of the out-of-sync bitmap 40 as a function of the current scanning location of the out-of-sync bitmap 40 by the synchronization scanning operation. For example, the bandwidth reduction scanning logic 29 initiates the bandwidth reduction scanning operation at the current scanning location of the out-of-sync bitmap 40 by the synchronization scanning operation, but in a scanning direction opposite the scanning direction of the synchronization scanning operation. As a result, the opportunities of the bandwidth reduction scanning logic 29 to reset the set flag bits corresponding to tracks or other volume portions determined to be not allocated to the primary volume are increased. Thus, the bandwidth reduction scanning logic 29 has the opportunity to reset a candidate set flag bit as appropriate before the candidate set flag bit is reached by the scanning of the OOS bitmap 40 in the opposite direction by the synchronization scanning logic 35.

As the initiated bandwidth reduction scanning of the out-of-sync bitmap 40 continues (block 554, FIG. 6)), a bit of the out-of-sync bitmap 40 which has been set as a flag may be detected (block 508) by the bandwidth reduction scanning logic 29. As previously mentioned, a bit which has been set as a flag indicates to the synchronization scanning logic 35 that data stored in an associated volume portion is to be mirrored from the primary volume to the secondary volume toward the eventual formation of a consistency group. However, in accordance with one aspect of bandwidth management of the present description, the bandwidth reduction scanning logic determines whether the volume portion associated with the set bit has been allocated to the primary volume of the out-of-sync bitmap 40 being scanned. It is appreciated herein that subsequent to writing data to the volume portion and setting the associated bit of the out-of-sync bitmap 40, that the associated volume portion may no longer be allocated to the particular volume of the out-of-sync bitmap 40. If so, mirroring of the data of the volume portion no longer allocated to the primary volume may be bypassed, thereby reducing bandwidth utilization of the mirroring operation.

Accordingly, in response to a detection (block 558) of a set flag by the bandwidth reduction scanning logic 29, the bandwidth reduction logic reads (block 562) the snapshot copy of the volume table of contents (VTOC) data structure for the primary volume (reflecting the state of the VTOC when the current consistency group was initiated) and determines (block 566) based upon the read contents whether the track or other volume portion associated with the detected set bit of the out-of-sync bitmap 40 is currently allocated to the primary volume. In one embodiment, the bandwidth reduction scanning logic 29 is configured to, in initiating the bandwidth reduction scanning, copy the volume table of contents data structure for the primary volume from storage 10*a* (FIG. 1) to a readily accessible location such as the cache 26 (FIG. 2) to provide a snapshot of the VTOC in response to the consistency group initiation. In other embodiments, the bandwidth reduction scanning logic 29 is configured to read (block 562, FIG. 6) the volume table of contents data structure for the primary volume directly from storage 10*a*.

If the bandwidth reduction scanning logic 29 determines (block 566) that the volume portion associated with the detected set bit of the out-of-sync bitmap 40 is currently allocated to the primary volume, the bandwidth reduction scanning logic 29 leaves (block 570, FIG. 6) the detected set flag bit as unchanged, that is, in a set state which indicates that data of associated track is to be mirrored to the secondary volume for consistency group. By leaving the detected set flag bit as set, the synchronization scanning logic 35 will eventually detect the set bit and in response, will cause the mirror logic 28 to mirror the data of associated track to the secondary volume for the consistency group as described above in connection with FIG. 5.

Conversely, if the bandwidth reduction scanning logic 29 determines (block 566) that the track or other volume portion associated with the detected set bit of the out-of-sync bitmap 40 is not currently allocated to the primary volume, the bandwidth reduction scanning logic 29 resets (block 574) the detected flag bit which in the reset state, indicates that the data of associated volume portion such as a track is not to be mirrored to the secondary volume for consistency group. By resetting the detected set flag bit to the reset state, the synchronization scanning logic 35 will in the course of the synchronization scanning, not detect the reset bit as a set bit and in response, will not cause the mirror logic 28 to mirror the data of associated track to the secondary volume for the consistency group. In this manner, mirroring of the data of a volume portion no longer allocated to the primary volume may be bypassed, thereby reducing bandwidth utilization of the mirroring operation for volume portions determined to no longer be allocated to the primary volume. In addition, formation of the consistency group may be accelerated since mirroring of the data of a volume portion no longer allocated to the primary volume is bypassed.

The bandwidth reduction scanning logic 29 determines (block 578) whether all bits of the out-of-sync bitmap 40 have been scanned by the bandwidth reduction scanning operation. If not, bandwidth reduction scanning continues (block 554, FIG. 6). Conversely, if the bandwidth reduction scanning logic 29 determines (block 578) that all bits of the out-of-sync bitmap 40 have been scanned by the bandwidth reduction scanning operation, the bandwidth reduction scanning operation ends (block 582, FIG. 6) for the current consistency group.

Figure 7:
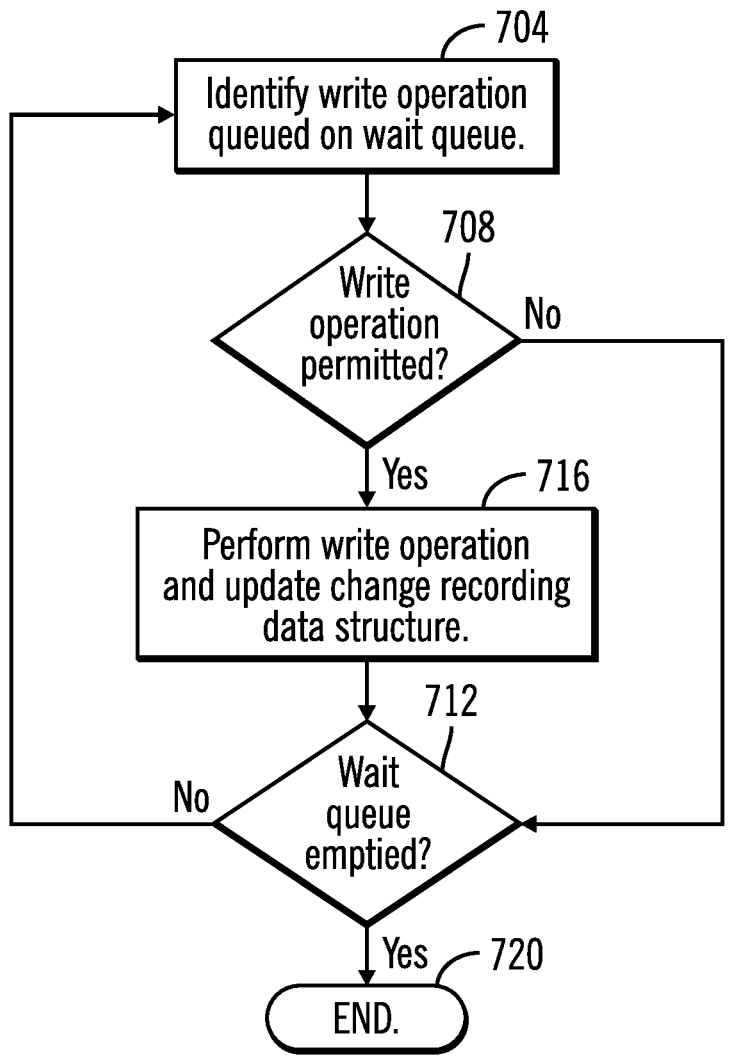
FIG. 7 illustrates an example of wait queue processing operations of the storage controller of the computing environment of FIG. 1 employing bandwidth management in accordance with one aspect of the present description.

As previously mentioned, once the formation of a consistency group has been initiated, the storage controller in one embodiment queues further write operations to the primary volume in a wait queue 43 (FIG. 2), to ensure that data locations of the primary volume of the OOS bitmap 40 which have not yet been mirrored to the secondary volume of the current consistency group are protected from being overwritten by subsequent write operations until the data has been safely mirrored to the secondary volume of the current consistency group. FIG. 7 describes one example of operations of the mirror logic 28 in processing the wait queue as the current consistency group is being formed. For each write operation identified (block 704, FIG. 7) on the wait queue 43, the storage manager determines (block 708) whether the write operation is permitted. For example, if it is determined that data locations of the primary volume targeted by the queued write operation correspond to data locations associated with set bits of the OOS bitmap 40 such that the data of those locations has not yet been mirrored to the secondary volume of the current consistency group, the queued write operation is not permitted at that time so as to protect the data locations from being overwritten by the queued write operation until the data has been safely mirrored to the secondary volume of the current consistency group. Accordingly, the queued write operation remains on the queue and another write operation on the wait queue is identified (block 704) and processed as discussed above until the wait queue has been emptied (block 712, FIG. 7)

Conversely, if it is determined that data locations of the primary volume targeted by the queued write operation correspond to data locations associated with reset bits of the OOS bitmap 40 such that the data of those locations has already been safely mirrored to the secondary volume of the current consistency group, or the data is not to be mirrored to the secondary volume because the corresponding volume portion was determined by the bandwidth reduction scanning logic to not be allocated to the primary volume, the queued write operation may be permitted to proceed at that time since it is no longer needed to protect the data locations from being overwritten by the queued write operation. Accordingly, the queued write operation is removed from the wait queue and executed to perform (block 716) the write operation.

As previously mentioned, the change recording (CR) bitmap 44 has a bit for every track on the source primary storage volume. When there is a write on a track of the source primary storage volume after the current consistency group is initiated, then a bit is set in the CR bitmap to indicate that the track needs to be copied in the subsequent remote copy for the next consistency group. Accordingly, when a write operation is removed from the wait queue and is executed (block 716), the CR bitmap 44 is updated by setting a bit associated with each write location of the write operation. Once the current consistency group is completed, the change recording (CR) bitmap 44 is merged (block 440, FIG. 4) with the out-of-sync bitmap 40 for the formation of the next consistency group. Another write operation on the wait queue is then identified (block 704) and processed as discussed above until the wait queue has been emptied (block 712) ending (block 720, FIG. 7) processing of the wait queue.

Figure 8:
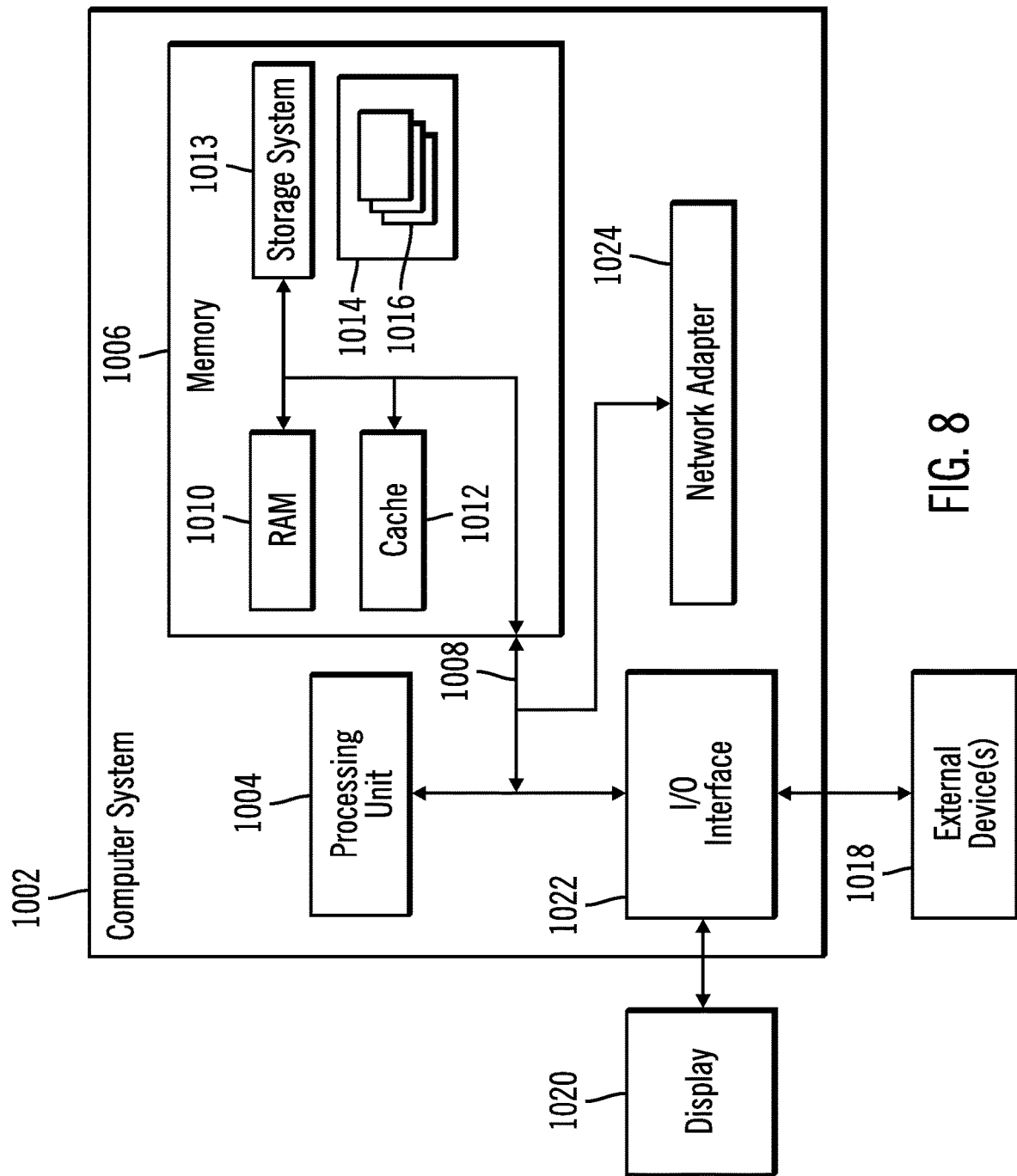
FIG. 8 illustrates a computer embodiment employing bandwidth management in a data storage system in accordance with the present description.

The computational components of the figures may each be implemented in one or more computer systems, such as the computer system 1002 shown in FIG. 8. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer system 1002 may be implemented as program modules 1016 which generally carry out the functions and/or methodologies of embodiments of the invention as described herein. The system of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The reference characters used herein, such as i, j, and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out processor operations in accordance with aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A system for use with a primary volume of data and a secondary volume of data, comprising:
    a data storage system having a storage controller and at least one storage unit controlled by the storage controller and configured to store data in the primary volume, wherein the storage controller has a processor and a cache, and
    a computer program product comprising a computer readable storage medium having program instructions embodied therewith, the program instructions executable by a processor of the storage controller to cause storage controller processor operations, the storage controller processor operations comprising:
        a bandwidth reduction scanning operation scanning an out-of-synchronization data structure which has a plurality of flags, said bandwidth reduction operation scanning including a first flag detecting operation detecting a flag which has been set to indicate data stored in an associated volume portion is to be mirrored from a primary volume to a secondary volume to form a consistency group;
        in response to a detection of a set flag in the bandwidth reduction scanning operation, the bandwidth reduction scanning operation determining whether the volume portion storing the data associated with the set flag has been allocated to the primary volume;
        in response to a determination that the volume portion associated with the set flag has not been allocated to the primary volume, the bandwidth reduction scanning operation resetting the detected flag to indicate that the data of the associated volume portion is not to be mirrored from the primary volume to the secondary volume to form a consistency group; and
        continuing the bandwidth reduction scanning operation until said bandwidth reduction operation scanning has completed scanning of the out-of-synchronization data structure;
        wherein mirroring of the data of a volume portion associated with a reset detected flag is bypassed, reducing bandwidth usage of a mirroring operation.

2. The system of claim 1, wherein the storage controller operations further comprise:
    in response to a determination that the volume portion associated with the set flag has been allocated to the primary volume, the bandwidth reduction scanning operation leaving the detected flag unchanged to indicate that the data of the associated volume portion is to be mirrored from the primary volume to the secondary volume to form a consistency group.

3. The system of claim 1, wherein the storage controller operations further comprise:
    receiving write operations to write data in a primary volume;
    a synchronization scanning operation scanning the out-of-synchronization data structure in parallel with the bandwidth reduction scanning operation, said synchronization operation scanning including a second flag detecting operation detecting a flag set to indicate data stored in an associated volume portion is to be mirrored from the primary volume to the secondary volume to form a consistency group;
    in response to a detection of a set flag in the synchronization scanning operation, the synchronization scanning operation mirroring data written to the associated volume portion of the primary volume to the secondary volume wherein a flag reset by the bandwidth reduction scanning operation is not detected in the synchronization scanning operation so that mirroring of the data of a volume portion associated with a flag reset by the bandwidth reduction scanning operation is bypassed reducing bandwidth usage by the mirroring; and
    continuing the synchronization scanning operation until said synchronization operation scanning has completed scanning of the out-of-synchronization data structure.

4. The system of claim 2 wherein the storage controller operations further comprise:
    initiating a consistency group at a start time; and
    in response to the consistency group initiation, initiating the bandwidth reduction scanning operation and queuing write operations to the primary volume in a queue until said synchronization scanning operation has completed scanning of the out-of-synchronization data structure and the initiated consistency group is completed.

5. The system of claim 4 wherein the determining whether the volume portion storing the data associated with the set flag has been allocated to the primary volume, includes reading a volume table of contents data structure having fields which lists data sets stored in the primary volume, the locations of the data sets within the primary volume, and locations of free space on the primary volume wherein a volume portion location listed as free space on the primary volume is determined to be not allocated to the primary volume.

6. The system of claim 5 wherein the initiating the bandwidth reduction scanning operation includes copying the volume table of contents data structure for the primary volume to a cache in response to the consistency group initiation wherein the copy of the volume table of contents data structure provides a snapshot of the volume table of contents data structure when the consistency group was initiated.

7. The system of claim 6 wherein the initiating the bandwidth reduction scanning operation includes allocating a processor thread for the primary volume, determining a current scanning location of the out-of-synchronization data structure by the synchronization scanning operation and initiating the bandwidth reduction scanning operation at a scanning location of the out-of-synchronization data structure as a function of the current scanning location of the out-of-synchronization data structure by the synchronization scanning operation, and in a scanning direction opposite a scanning direction of the synchronization scanning operation.

8. The system of claim 1 wherein the out-of-synchronization data structure includes a bitmap having bits, each bit of the bitmap providing a flag of the out-of-synchronization data structure wherein each bitmap bit when set, indicates data stored in an associated volume portion is to be mirrored from a primary volume to a secondary volume to form a consistency group.

9. A method, comprising:
a bandwidth reduction scanning operation scanning an out-of-synchronization data structure which has a plurality of flags, said bandwidth reduction operation scanning including a first flag detecting operation detecting a flag which has been set to indicate data stored in an associated volume portion is to be mirrored from a primary volume to a secondary volume to form a consistency group;
in response to a detection of a set flag in the bandwidth reduction scanning operation, the bandwidth reduction scanning operation determining whether the volume portion storing the data associated with the set flag has been allocated to the primary volume;
in response to a determination that the volume portion associated with the set flag has not been allocated to the primary volume, the bandwidth reduction scanning operation resetting the detected flag to indicate that the data of the associated volume portion is not to be mirrored from the primary volume to the secondary volume to form a consistency group; and
continuing the bandwidth reduction scanning operation until said bandwidth reduction operation scanning has completed scanning of the out-of-synchronization data structure;
wherein mirroring of the data of a volume portion associated with a reset detected flag is bypassed, reducing bandwidth usage of a mirroring operation.

10. The method of claim 9, further comprising:
in response to a determination that the volume portion associated with the set flag has been allocated to the primary volume, the bandwidth reduction scanning operation leaving the detected flag unchanged to indicate that the data of the associated volume portion is to be mirrored from the primary volume to the secondary volume to form a consistency group.

11. The method of claim 9, further comprising:
receiving write operations to write data in a primary volume;
a synchronization scanning operation scanning the out-of-synchronization data structure in parallel with the bandwidth reduction scanning operation, said synchronization operation scanning including a second flag detecting operation detecting a flag set to indicate data stored in an associated volume portion is to be mirrored from the primary volume to the secondary volume to form a consistency group;
in response to a detection of a set flag in the synchronization scanning operation, the synchronization scanning operation mirroring data written to the associated volume portion of the primary volume to the secondary volume wherein a flag reset by the bandwidth reduction scanning operation is not detected in the synchronization scanning operation so that mirroring of the data of a volume portion associated with a flag reset by the bandwidth reduction scanning operation is bypassed reducing bandwidth usage by the mirroring; and
continuing the synchronization scanning operation until said synchronization operation scanning has completed scanning of the out-of-synchronization data structure.

12. The method of claim 10 further comprising:
initiating a consistency group at a start time; and
in response to the consistency group initiation, initiating the bandwidth reduction scanning operation and queuing write operations to the primary volume in a queue until said synchronization scanning operation has completed scanning of the out-of-synchronization data structure and the initiated consistency group is completed.

13. The method of claim 12 wherein the determining whether the volume portion storing the data associated with the set flag has been allocated to the primary volume, includes reading a volume table of contents data structure having fields which lists data sets stored in the primary volume, the locations of the data sets within the primary volume, and locations of free space on the primary volume wherein a volume portion location listed as free space on the primary volume is determined to be not allocated to the primary volume.

14. The method of claim 13 further comprising wherein the initiating the bandwidth reduction scanning operation includes copying the volume table of contents data structure for the primary volume to a cache in response to the consistency group initiation wherein the copy of the volume table of contents data structure provides a snapshot of the volume table of contents data structure when the consistency group was initiated.

15. The method of claim 14 wherein the initiating the bandwidth reduction scanning operation includes allocating a processor thread for the primary volume, determining a current scanning location of the out-of-synchronization data structure by the synchronization scanning operation and initiating the bandwidth reduction scanning operation at a scanning location of the out-of-synchronization data structure as a function of the current scanning location of the out-of-synchronization data structure by the synchronization scanning operation, and in a scanning direction opposite a scanning direction of the synchronization scanning operation.

16. The method of claim 9 wherein the out-of-synchronization data structure includes a bitmap having bits, each bit of the bitmap providing a flag of the out-of-synchronization data structure wherein each bitmap bit when set, indicates data stored in an associated volume portion is to be mirrored from a primary volume to a secondary volume to form a consistency group.

17. A computer program product for use with a host, primary and secondary volumes, a data storage system having a storage controller and at least one storage unit controlled by the storage controller and configured to store data in a primary volume, wherein the storage controller has a processor and a cache, wherein the computer program product comprises a computer readable storage medium having program instructions embodied therewith, the program instructions executable by a processor of the storage controller to cause storage controller processor operations, the storage controller processor operations comprising:

a bandwidth reduction scanning operation scanning an out-of-synchronization data structure which has a plurality of flags, said bandwidth reduction operation scanning including a first flag detecting operation detecting a flag which has been set to indicate data stored in an associated volume portion is to be mirrored from a primary volume to a secondary volume to form a consistency group;

in response to a detection of a set flag in the bandwidth reduction scanning operation, the bandwidth reduction scanning operation determining whether the volume portion storing the data associated with the set flag has been allocated to the primary volume;

in response to a determination that the volume portion associated with the set flag has not been allocated to the primary volume, the bandwidth reduction scanning operation resetting the detected flag to indicate that the data of the associated volume portion is not to be mirrored from the primary volume to the secondary volume to form a consistency group; and continuing the bandwidth reduction scanning operation until said bandwidth reduction operation scanning has completed scanning of the out-of-synchronization data structure;

wherein mirroring of the data of a volume portion associated with a reset detected flag is bypassed, reducing bandwidth usage of a mirroring operation.

18. The computer program product of claim 17, wherein the storage controller operations further comprise:

in response to a determination that the volume portion associated with the set flag has been allocated to the primary volume, the bandwidth reduction scanning operation leaving the detected flag unchanged to indicate that the data of the associated volume portion is to be mirrored from the primary volume to the secondary volume to form a consistency group.

19. The computer program product of claim 17, wherein the storage controller operations further comprise:

receiving write operations to write data in a primary volume;

a synchronization scanning operation scanning the out-of-synchronization data structure in parallel with the bandwidth reduction scanning operation, said synchronization operation scanning including a second flag detecting operation detecting a flag set to indicate data stored in an associated volume portion is to be mirrored from the primary volume to the secondary volume to form a consistency group;

in response to a detection of a set flag in the synchronization scanning operation, the synchronization scanning operation mirroring data written to the associated volume portion of the primary volume to the secondary volume wherein a flag reset by the bandwidth reduction scanning operation is not detected in the synchronization scanning operation so that mirroring of the data of a volume portion associated with a flag reset by the bandwidth reduction scanning operation is bypassed reducing bandwidth usage by the mirroring; and continuing the synchronization scanning operation until said synchronization operation scanning has completed scanning of the out-of-synchronization data structure.

20. The computer program product of claim 18 wherein the storage controller operations further comprise:

initiating a consistency group at a start time; and in response to the consistency group initiation, initiating the bandwidth reduction scanning operation and queuing write operations to the primary volume in a queue until said synchronization scanning operation has completed scanning of the out-of-synchronization data structure and the initiated consistency group is completed.

21. The computer program product of claim 20 wherein the determining whether the volume portion storing the data associated with the set flag has been allocated to the primary volume, includes reading a volume table of contents data structure having fields which lists data sets stored in the primary volume, the locations of the data sets within the primary volume, and locations of free space on the primary volume wherein a volume portion location listed as free space on the primary volume is determined to be not allocated to the primary volume.

22. The computer program product of claim 21 wherein the initiating the bandwidth reduction scanning operation includes copying the volume table of contents data structure for the primary volume to a cache in response to the consistency group initiation wherein the copy of the volume table of contents data structure provides a snapshot of the volume table of contents data structure when the consistency group was initiated.

23. The computer program product of claim 22 wherein the initiating the bandwidth reduction scanning operation includes allocating a processor thread for the primary volume, determining a current scanning location of the out-of-synchronization data structure by the synchronization scanning operation and initiating the bandwidth reduction scanning operation at a scanning location of the out-of-synchronization data structure as a function of the current scanning location of the out-of-synchronization data structure by the synchronization scanning operation, and in a scanning direction opposite a scanning direction of the synchronization scanning operation.

24. The computer program product of claim 17 wherein the out-of-synchronization data structure includes a bitmap having bits, each bit of the bitmap providing a flag of the out-of-synchronization data structure wherein each bitmap bit when set, indicates data stored in an associated volume portion is to be mirrored from a primary volume to a secondary volume to form a consistency group.

* * * * *